(12) United States Patent
Chang et al.

(10) Patent No.: US 7,295,374 B2
(45) Date of Patent: Nov. 13, 2007

(54) MICRO-LENS AND MICRO-LENS FABRICATION METHOD

(75) Inventors: Ming-Chih Chang, Sinyuan Township, Pingtung County (TW); Hua-Shu Wu, Hsinchu (TW); Tsung-Mu Lai, Jhubei (TW)

(73) Assignee: Taiwan Semiconductor Manufacturing Co. Ltd., Hsin-Chu (TW)

( * ) Notice: Subject to any disclaimer, the term of this patent is extended or adjusted under 35 U.S.C. 154(b) by 0 days.

(21) Appl. No.: 11/066,668

(22) Filed: Feb. 25, 2005

(65) Prior Publication Data

US 2006/0193054 A1 Aug. 31, 2006

(51) Int. Cl.
G02B 27/10 (2006.01)
B29D 11/00 (2006.01)
G03C 5/00 (2006.01)

(52) U.S. Cl. .................. 359/619; 359/900; 216/26; 430/321

(58) Field of Classification Search ............... 359/619, 359/620, 900; 216/26, 51, 55, 97; 430/321; 264/1.32, 1.7; 65/17.3; 716/21
See application file for complete search history.

(56) References Cited

U.S. PATENT DOCUMENTS

| | | | | |
|---|---|---|---|---|
| 6,163,352 A | * | 12/2000 | Ichikawa et al. | 349/106 |
| 6,542,672 B2 | * | 4/2003 | Jewell et al. | 385/49 |
| 6,618,201 B2 | * | 9/2003 | Nishikawa et al. | 359/619 |
| 6,951,772 B2 | * | 10/2005 | Lecohier et al. | 438/98 |
| 7,143,609 B2 | * | 12/2006 | Aitken et al. | 65/26 |

* cited by examiner

*Primary Examiner*—Ricky Mack
*Assistant Examiner*—Jack Dinh
(74) *Attorney, Agent, or Firm*—Thomas, Kayden, Horstemeyer & Risley (57) ABSTRACT

A method of manufacturing a micro-lens is disclosed. The method includes providing a convex photoresist surface, forming a lens mold on the convex photoresist surface, removing the lens mold from the convex photoresist surface, forming a micro-lens in the lens mold and removing the micro-lens from the lens mold.

16 Claims, 7 Drawing Sheets

MICRO-LENS AND MICRO-LENS FABRICATION METHOD

FIELD OF THE INVENTION

The present invention relates to methods for fabricating micro-lenses. More particularly, the present invention relates to a micro-lens and a micro-lens fabrication method which includes fabricating a micro-lens mold and molding a micro-lens in the micro-lens mold, and can be used to fabricate micro-lenses of various sizes.

BACKGROUND OF THE INVENTION

Solid state imaging devices are currently used in a wide range of applications including, for example, video movies and monitoring cameras. Optical communications techniques have been widely used in various fields. Such devices depend on opto-electrical integrated circuits that are fabricated on a substrate such as a semiconductor wafer. In an opto-electrical integrated circuit used in an optical information processing system, various optical components, such as a light-emitting device and a micro lens, are formed integrally on the substrate. This minimizes the space required for the optical components and optimizes performance.

In optical communications, optical signals are transmitted through optical fibers. Generally, use is made of an optical switching device for changing the transmission path of optical signals from one fiber to another. To attain proper data transmission, operation of the switching device requires a large data-handling capacity, high-speed data transmission and high stability, for example. Therefore, it is preferable that an optical switching device incorporate a micromirror unit which is fabricated using a micro-machining technique. The use of a micromirror obviates the need to convert an optical signal to an electrical signal in performing the switching operation between the data input path and the data output path of the switching device.

One widely-used method for manufacturing micro lenses is the molding polymerization method. In the molding polymerization method, polymer powder is placed into a lens mold and hot-pressed to form a substrate with a micro-lens array. Although this method is cost-effective and simple, manufacture of a mold having the desired micro-lens curvature is an extremely difficult task, particularly in cases in which the lenses have an irregular shape and small size (less than about 0.5 micron meter). Accurate control of focus length requires a time-consuming adjustment process carried out by highly-skilled personnel.

Another common method for manufacture of micro-lenses is the ion exchange diffusion method. In such a method, a mask layer having a desired pattern is formed on a transparent, flat glass substrate. The substrate and mask layer is immersed in a salt solution bath. Positive ions such as sodium and potassium cations contained in the substrate are exchanged with positive ions such as titanium cations contained in the salt solution. The ion-exchanged regions in the substrate have a different refractive index from the original refractive index of the glass, and thus, form refractive index distribution regions having a light-refracting action. The ion exchange diffusion method, however, is not economical on a wide scale since the mask layer must be formed on each individual substrate.

Figure 1A:
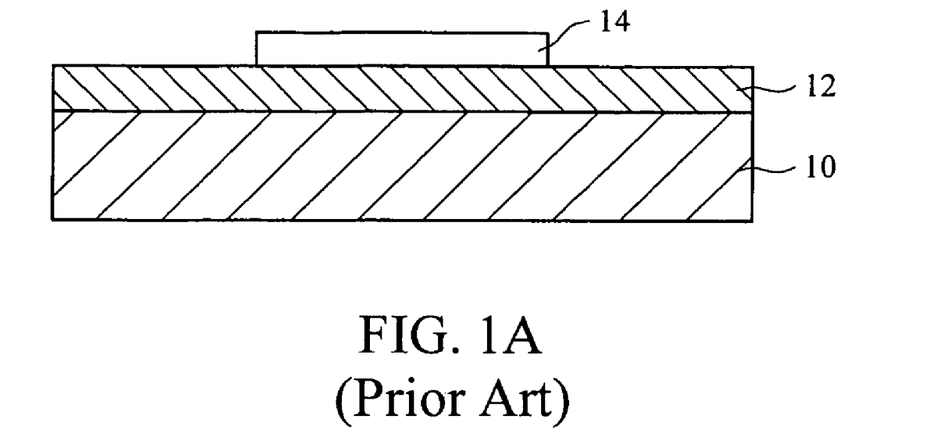
FIGS. 1A-1E are cross-sectional views illustrating sequential fabrication of a micro-lens on a substrate according to a conventional method.
Figure 1B:
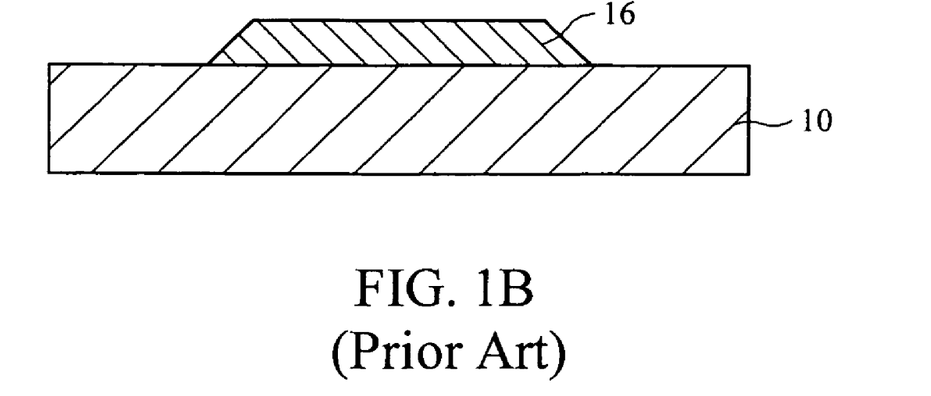
Figure 1C:
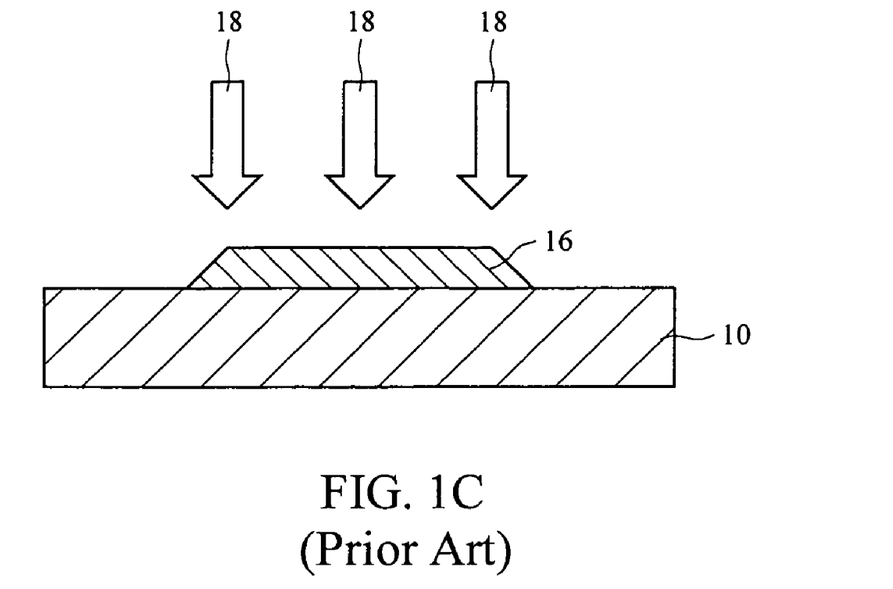
Figure 1D:
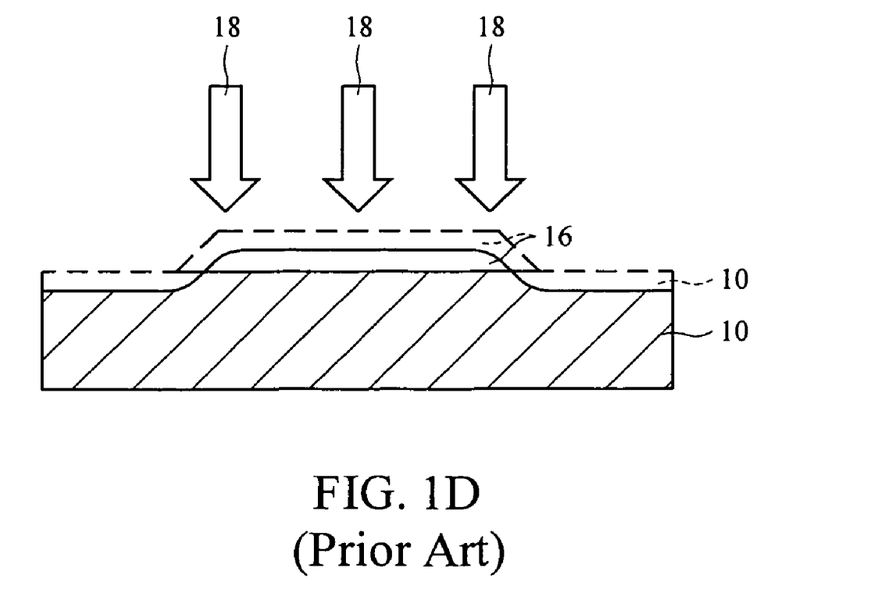
Figure 1E:
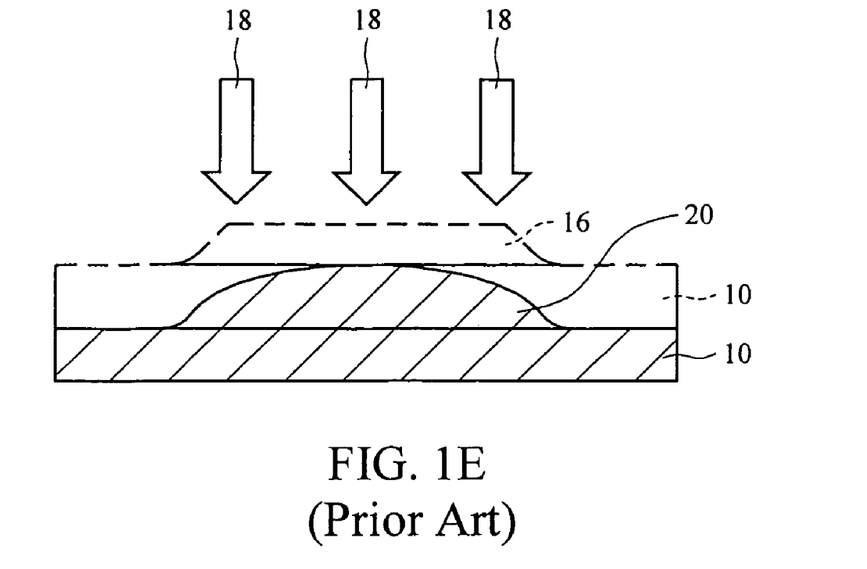

Another conventional method used to fabricate micro-lenses is shown in FIGS. 1A-1E. In FIG. 1A, a substrate 10, which is GaAs, is provided. A silicon dioxide film 12 is formed on the substrate 10, and a photoresist layer 14 is deposited on the silicon dioxide film 12. As shown in FIG. 1B, the silicon dioxide film 12 of FIG. 1A is then subjected to a dry etch process to define an etching mask 16 that conforms to the pattern of the photoresist 14. As shown in FIGS. 1C and 1D, in a reactive ion beam etch (RIE) step, the substrate 10 is then subjected to a chlorine ion beam 18, which etches the substrate 10 according to the pattern defined by the etching mask 16. As shown in FIG. 1E, the chlorine ion beam 18 eventually etches the etching mask 16 from the substrate 10, leaving a micro-lens 20 on the region of the substrate 10 which was shielded by the etching mask 16. In a variation of the process, the substrate 10 is etched in a wet etch process.

One of the limitations of the conventional methods of fabricating micro-lenses is that the methods are incapable of being used to fabricate lenses having a large size (100 μm and greater). Accordingly, a novel method is needed for the large-scale fabrication of micro-lenses having a size of 100 μm or greater.

An object of the present invention is to provide a novel method of fabricating micro-lenses having a variety of sizes.

Another object of the present invention is to provide a novel spherical structure patterning method for fabricating a micro-lens.

Another object of the present invention is to provide a novel micro-mirror fabrication method which is suitable to fabricate micro-lenses on a large scale.

Still another object of the present invention is to provide a novel micro-lens array fabrication method in which a lens mold is fabricated, followed by fabrication of a micro-lens in the lens mold.

Yet another object of the present invention is to provide a novel micro-mirror fabrication method which is suitable to fabricate micro-lenses having a width or diameter of at least 100 μm, as well as micro-lenses of smaller size.

A still further object of the present invention is to provide a novel micro-lens fabrication method which includes providing a convex photoresist surface, forming a lens mold on the convex photoresist surface, removing the lens mold from the convex photoresist surface, and molding a micro-lens in the lens mold.

Yet another object of the present invention is to provide a novel micro-lens array manufacturing method in which multiple lens molds can be simultaneously fabricated on a substrate by curing a photoresist coating on the substrate and multiple micro-lenses can be fabricated in the respective lens molds.

A still further object of the present invention is to provide a novel micro-lens manufacturing method which is applicable to manufacturing micro-lenses suitable for a variety of applications.

Another object of the present invention is to provide a novel micro-lens having a generally transparent lens body that is formed by providing a convex photoresist surface, forming a lens mold on the convex photoresist surface, removing the convex photoresist surface from the lens mold, forming the lens body in the lens mold and removing the lens mold from the lens body.

SUMMARY OF THE INVENTION

In accordance with these and other objects and advantages, the present invention is generally directed to a novel method for fabricating a micro-lens. The method includes providing a convex photoresist surface, forming a lens mold on the convex photoresist surface, removing the convex photoresist surface from the lens mold, and molding a micro-lens in the lens mold. The method of the present invention is particularly suitable for the fabrication of micro-lenses having a width or diameter of at least 100 μm, as well as micro-lenses of smaller size. The micro-lenses can be fabricated on a large scale by simultaneously forming multiple lens molds on a substrate and molding the micro-lenses in the respective lens molds.

The present invention further includes a micro-lens having a generally transparent lens body that is formed by providing a convex photoresist surface, forming a lens mold on the convex photoresist surface, removing the convex photoresist surface from the lens mold, forming the lens body in the lens mold and removing the lens mold from the lens body.

BRIEF DESCRIPTION OF THE DRAWINGS

The invention will now be described, by way of example, with reference to the accompanying drawings, in which.

DETAILED DESCRIPTION OF THE INVENTION

The present invention contemplates a novel spherical structure patterning method which is suitable for the large-scale fabrication of micro-lenses. According to the method, a substrate, which may be a silicon semiconductor wafer, for example, is provided. A photoresist coating is provided on the substrate, after which the photoresist is cured using UV light. A lens mold is deposited on the convex exterior surface of the cured photoresist, and the photoresist is removed from the lens mold. A micro-lens is then formed in the lens mold, typically by the deposition of spin-on-glass (SOG) in the mold. Multiple lens molds may be simultaneously fabricated on a single substrate to facilitate large-scale fabrication of micro-lenses. The method of the present invention is particularly suitable for the fabrication of micro-lenses having a width or diameter of at least 100 μm, as well as micro-mirrors of smaller size.

The present invention further contemplates a novel micro-lens. The micro-lens includes a generally transparent lens body. The lens body of the micro-lens is formed by providing a convex photoresist surface, forming a lens mold on the convex photoresist surface, removing the convex photoresist surface from the lens mold, forming the lens body in the lens mold and removing the lens mold from the lens body.

Figure 2A:
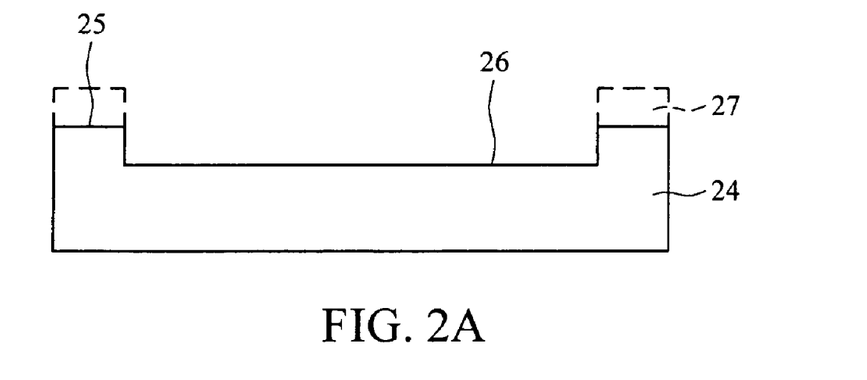
FIGS. 2A-2G are cross-sectional views illustrating sequential fabrication of a micro-lens on a substrate according to the method of the present invention.

Referring initially to FIG. 2A, a first step according to the micro-lens manufacturing method according to the present invention includes providing a substrate 24, which is typically a silicon semiconductor wafer. An opening 26 is provided in a surface 25 of the substrate 24, typically using conventional photolithography techniques. This typically involves depositing a photoresist layer 27 (shown in phantom) on the surface 25, patterning the photoresist layer 27 to define the size and configuration of the opening 26, developing the photoresist layer 27, and etching the substrate 24 according to the pattern defined by the patterned photoresist layer 27 to form the opening 26.

Figure 2B:
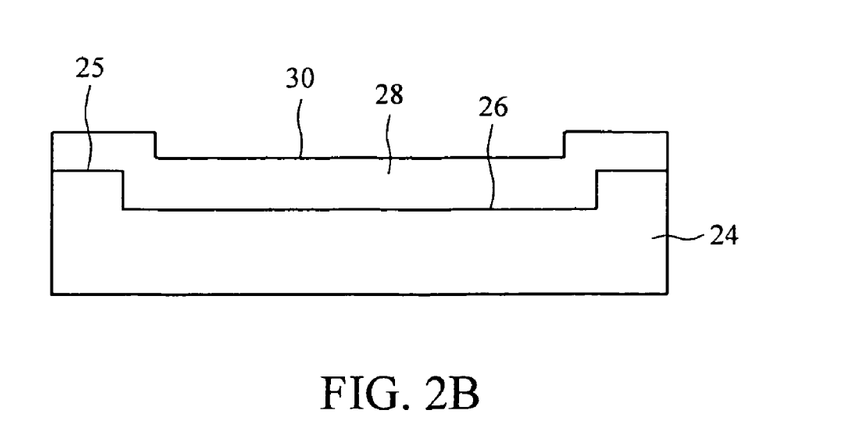

Referring next to FIG. 2B, a photoresist coating 28, which is preferably a self-aligned contact (SAC) photoresist, is coated on the surface 25 of the substrate 24, over the opening 26. The cross-sectional configuration of the photoresist coating 28 generally conforms to the cross-sectional configuration of the substrate 24. Accordingly, the photoresist coating 28 typically includes a photoresist depression 30 which generally overlies the opening 26 in the substrate 24.

Figure 2C:
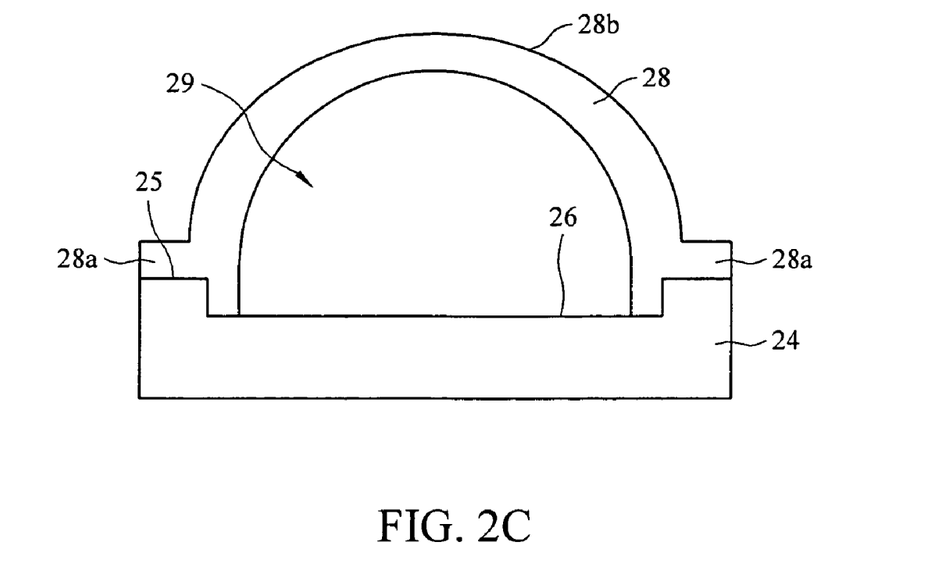

Referring next to FIG. 2C, the photoresist coating 28 is next subjected to a UV-curing step to cure the photoresist coating 28. During the UV-curing step, air trapped between the substrate 24 and the initially moist, pliable photoresist coating 28, as well as gases in the photoresist coating 28, expands and pushes the photoresist coating 28 outwardly from the substrate 24. This action forms an air cavity 29 and imparts a convex, bubble shape to the cured photoresist coating 28, such that the photoresist coating 28 has a convex photoresist surface 28b. The photoresist coating 28 hardens and remains attached to the surface 25 of the substrate 24 by an anchor portion 28a. Typical process conditions for the photoresist-curing step are as follows: a processing temperature of about 150~250 degrees C., and preferably, about 200 degrees C.; a UV intensity of typically about 100 mjoule/cm$^2$; and an exposure time of typically about 30~60 minutes.

Figure 2D:
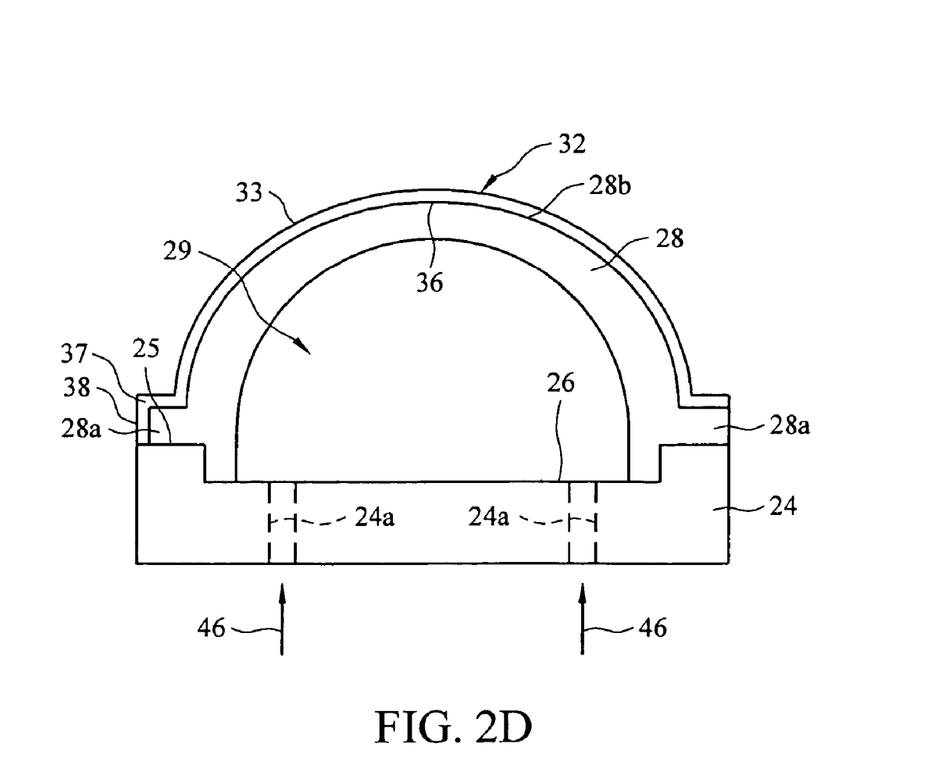

Referring next to FIG. 2D, a lens mold 32 is next formed typically by depositing a metal nitride such as TiN, TiAlN or the like on the convex photoresist surface 28b of the cured photoresist coating 28. This step may be carried out using a conventional physical vapor deposition (PVD) process. The lens mold 32 is removed from the substrate 24, and the cured photoresist coating 28 is removed from the lens mold 32, typically using a dry etching technique. Accordingly, a pair of etch access openings 24a is typically provided in the substrate 24, thereby establishing gas communication between the air cavity 29 and the exterior of the substrate 24. The substrate 24 is then subjected to a dry etching step in which an etchant gas 46, such as chlorine, for example, flows into the air cavity 29 through the etch access openings 24a. The etchant gas 46 etches the cured photoresist coating 28, including the anchor portions 28a, from the lens mold 32, thereby releasing the lens mold 32 from the substrate 24.

Figure 2E:
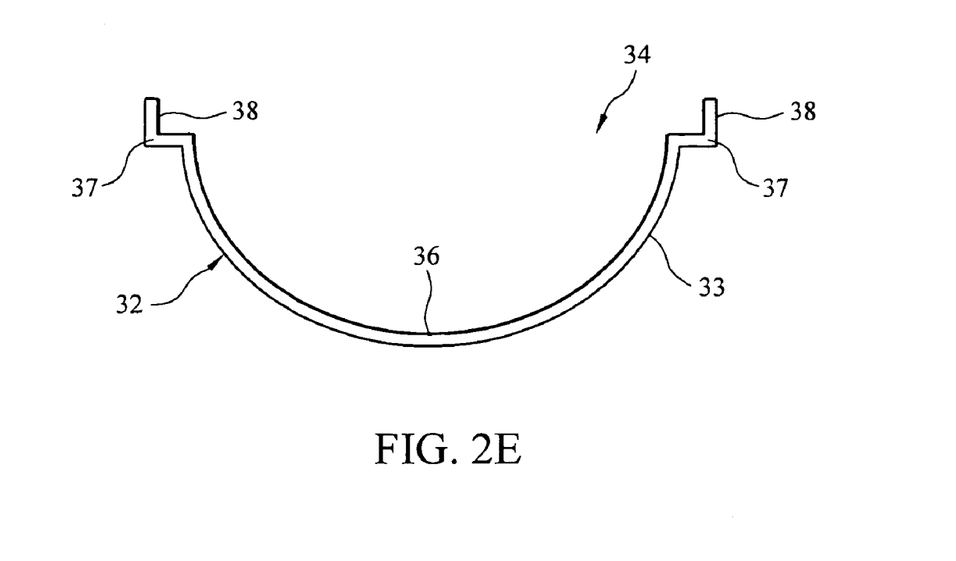

Referring next to FIG. 2E, the lens mold 32, released from the substrate 24 and having the cured photoresist coating 28 removed therefrom, typically includes a body portion 33 having a concave mold surface 36 which defines a mold interior 34. An annular mold rim 37 typically extends outwardly from the body portion 33, and a rim flange 38 may extend perpendicularly from the mold rim 37.

Figure 2F:
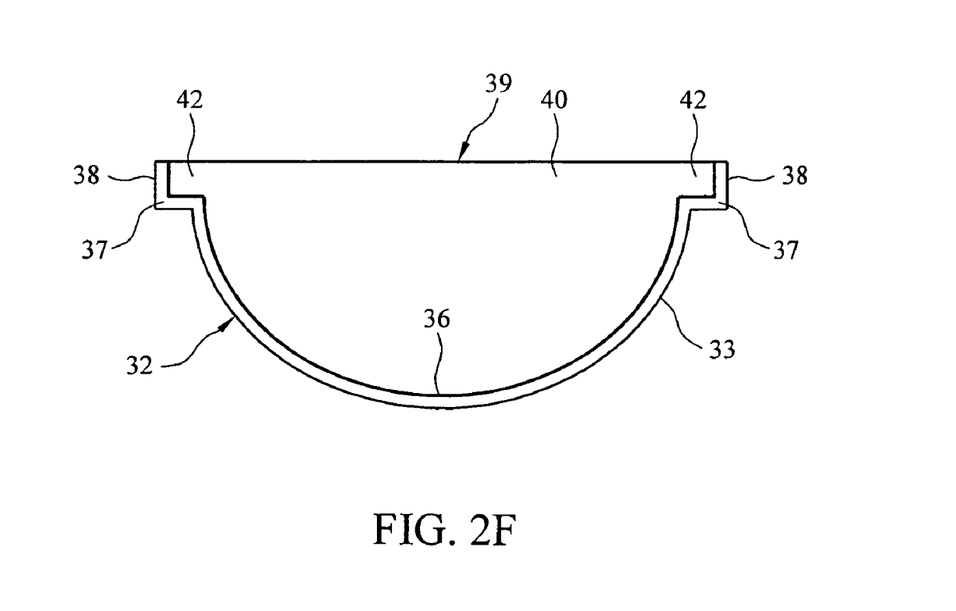

Referring next to FIG. 2F, in a lens-molding step, a micro-lens 39 is next formed in the mold interior 34. The micro-lens 39 may be formed by conventional HDP (high-density plasma) oxide deposition techniques or by conventional SOG (spin-on-glass) techniques. The micro-lens 39 typically includes a transparent lens body 40 having a convex surface 41 and an annular lens rim 42 that extends outwardly from the lens body 40.

Figure 2G:
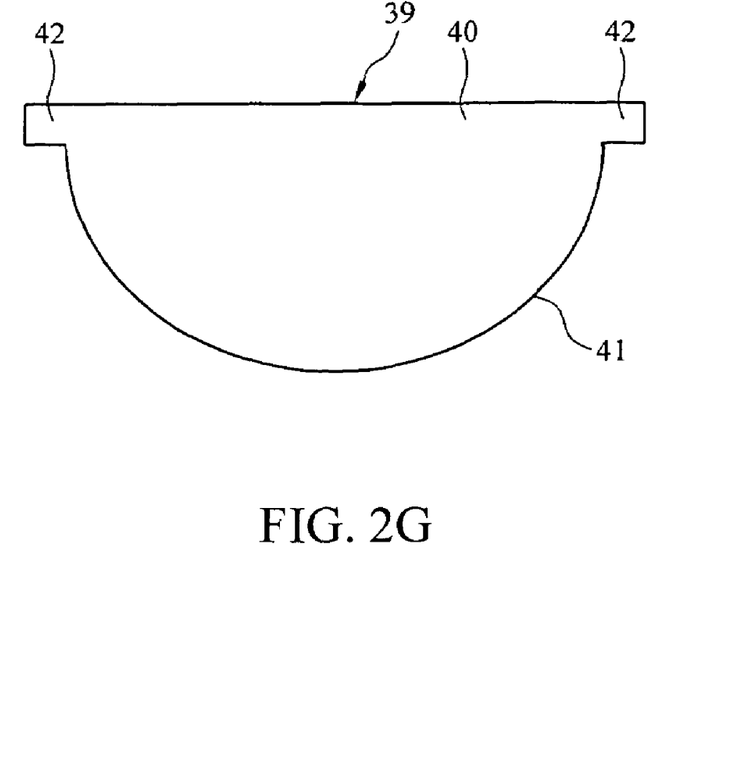

Referring next to FIG. 2G, the micro-lens 39 is removed from the lens mold 32 typically by subjecting the lens mold 32 to wet etching using acid. This removes the lens mold 32 from the convex surface 41 of the micro-lens 39. The micro-lens 39, released from the lens mold 32, is then capable o a assembly with other micro-lenses 39 into a micro-lens array (not shown) on a substrate to fabricate an optical device, according to the knowledge of those skilled in the art.

Figure 3:
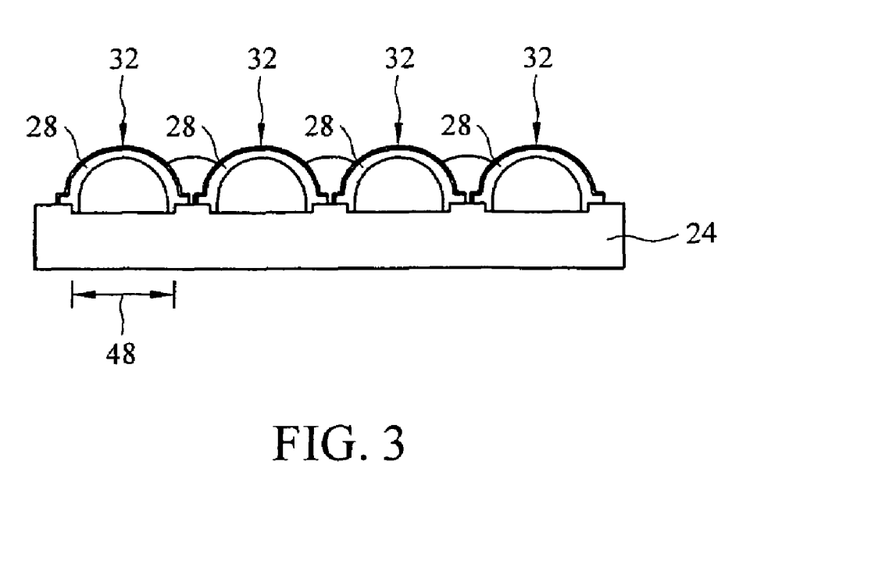
FIG. 3 is a cross-sectional view illustrating an array of lens molds being fabricated on a substrate according to the method of the present invention.

Referring next to FIG. 3, in typical application of the invention, a staggered array of lens molds 32 are simultaneously fabricated on a single substrate 24, as described above with respect to FIGS. 1A-2G. This facilitates large-scale fabrication of the micro-lens 39. It will be appreciated by those skilled in the art that the width or diameter 48 of each lens mold 32, which corresponds to the width or diameter of each micro-lens 39, may be as small as a few micrometers or as large as 200 micrometers. This enables fabrication of micro-lenses 39 which are capable of use in a variety of applications.

Figure 4:
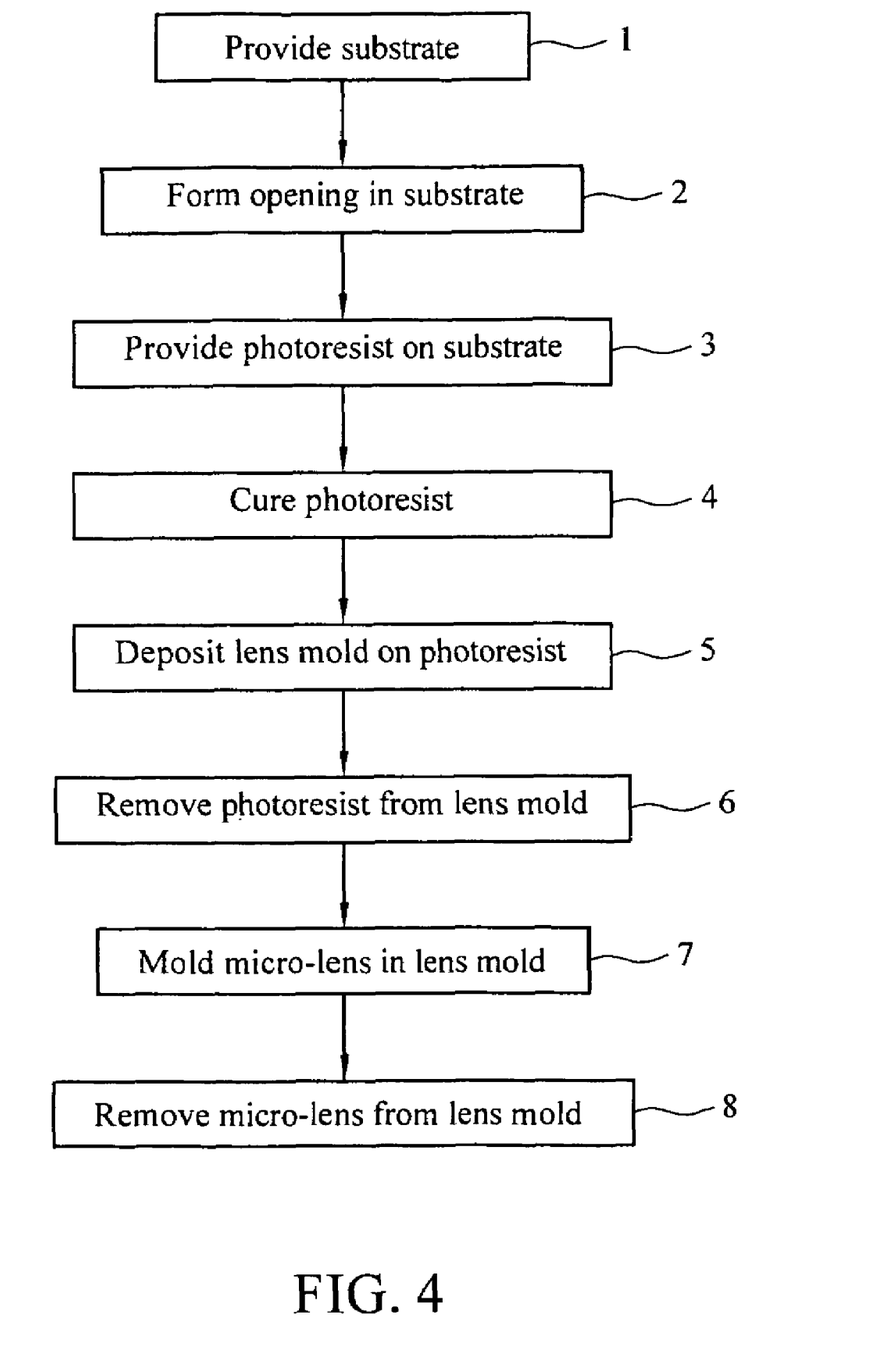
FIG. 4 is a flow diagram which summarizes sequential process steps according to the micro-lens manufacturing method of the present invention.

Referring next to the flow diagram of FIG. 4, wherein a typical sequence of process steps carried out according to the present invention is summarized. In step 1, a substrate is provided. In step 2, an opening is formed in the surface of the substrate. In step 3, a photoresist coating is provided on the surface of the substrate and covers the opening. In step 4, the photoresist coating is cured using UV light. In step 5, a lens mold is formed by coating a metal nitride layer on the convex surface of the cured photoresist coating. In step 6, the cured photoresist coating is removed from the lens mold and the lens mold is removed from the substrate. In step 7, a micro-lens is formed in the lens mold. In step 8, the micro-lens is removed from the lens mold.

While the preferred embodiments of the invention have been described above, it will be recognized and understood that various modifications can be made in the invention and the appended claims are intended to cover all such modifications which may fall within the spirit and scope of the invention.

What is claimed is:

1. A method of manufacturing a micro-lens, comprising:
   providing a substrate;
   forming a sacrificial layer on said substrate, wherein the sacrificial layer comprises an outer convex sacrificial surface and is made of a material different from a material of the substrate;
   forming a lens mold on said outer convex sacrificial surface of the sacrificial layer;
   removing said lens mold from said outer convex sacrificial surface of the sacrificial layer;
   forming a micro-lens in said lens mold; and
   removing said micro-lens from said lens mold.

2. The method of claim 1 wherein said outer convex sacrificial surface is formed by pushing the sacrificial layer outwardly from the substrate.

3. The method of claim 2 wherein the outer convex sacrificial surface of the sacrificial layer is formed by providing a curing step on said sacrificial layer.

4. The method of claim 1 wherein the substrate comprises an opening and the sacrificial layer is formed on said substrate, over said opening, such that the sacrificial layer hardens and remains attached to the substrate by an anchor portion surrounding the opening.

5. The method of claim 4 wherein said removing said lens mold from said convex sacrificial surface comprises releasing the lens mold from the substrate by removing the sacrificial layer, including the anchor portion, therefrom, to form a body portion having a concave mold surface which defines a mold interior, an annular mold rim extending outwardly from the body portion, and a rim flange extending perpendicularly from the mold rim.

6. The method of claim 1 wherein the sacrificial layer is a photoresist coating and the substrate is a silicon semiconductor wafer.

7. The method of claim 6 wherein said curing step comprises curing said photoresist coating using UV light.

8. The method of claim 1 wherein said forming a micro-lens in said lens mold comprises forming an oxide in said lens mold.

9. The method of claim 1 wherein said forming a micro-lens in said lens mold comprises forming spin-on-glass in said lens mold.

10. The method of claim 1 wherein said removing said lens mold from said outer convex sacrificial surface comprises etching said convex sacrificial surface from said lens mold.

11. The method of claim 1 wherein said removing said lens mold from said outer convex sacrificial surface comprises providing at least one etch access opening in said substrate and etching said sacrificial layer from said lens mold by introducing an etchant through said at least one etch access opening.

12. The method of claim 1 wherein said removing said micro-lens from said lens mold comprises etching said lens mold from said micro-lens.

13. The method of claim 12 wherein said removing said micro-lens from said lens mold comprises etching said lens mold from said micro-lens using a wet etch process.

14. The method of claim 1 wherein said forming a lens mold on said outer convex sacrificial surface comprises depositing a metal nitride on said convex sacrificial surface.

15. The method of claim 14 wherein said metal nitride is selected from the group consisting of TiN and TiAlN.

16. A method of manufacturing a micro-lens, comprising:
    providing a substrate;
    forming a sacrificial layer on said substrate;
    forming a convex sacrificial surface on the sacrificial layer;
    forming a lens mold on said convex sacrificial surface;
    removing said lens mold from said convex sacrificial surface;
    forming a micro-lens in said lens mold; and
    removing said micro-lens from said lens mold,
    wherein said removing said lens mold from said convex sacrificial surface comprises providing at least one etch access opening in said substrate and etching said sacrificial layer from said lens mold by introducing an etchant through said at least one etch access opening.

* * * * *